No. 852,175. PATENTED APR. 30, 1907.
T. FURLONG.
WHEEL RIM.
APPLICATION FILED MAY 26, 1906.
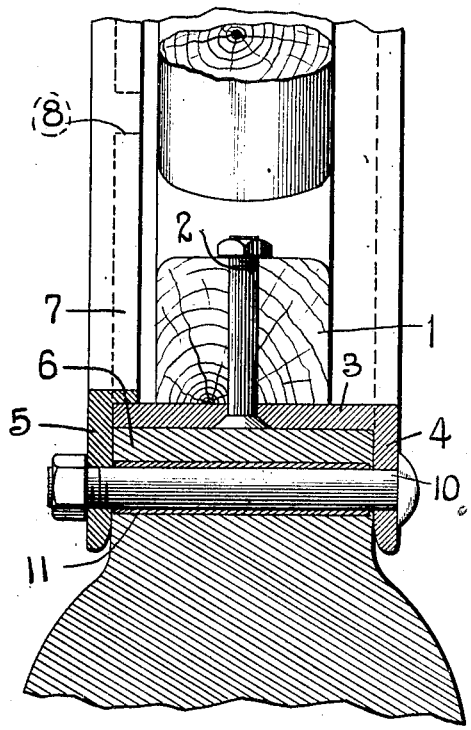
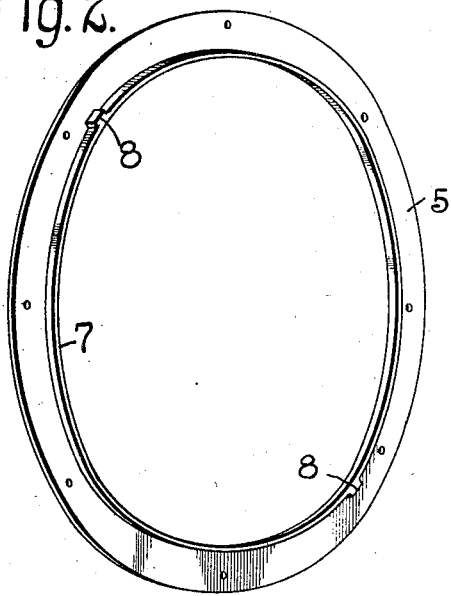
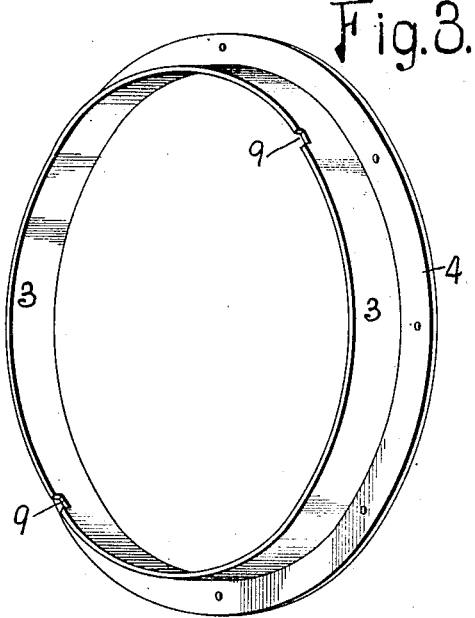
Witnesses
A. J. McCauley
Wells L. Church
Inventor:
Thomas Furlong
by Bakewell Cornwall
Att'y's.

UNITED STATES PATENT OFFICE.

THOMAS FURLONG, OF ST. LOUIS, MISSOURI.

WHEEL-RIM.

No. 852,175.   Specification of Letters Patent.   Patented April 30, 1907.

Application filed May 26, 1906. Serial No. 318,912.

*To all whom it may concern:*

Be it known that I, THOMAS FURLONG, a citizen of the United States, residing at St. Louis, Missouri, have invented a certain new and useful Improvement in Wheel-Rims, of which the following is a full, clear, and exact description, such as will enable others skilled in the art to which it appertains to make and use the same, reference being had to the accompanying drawings, forming part of this specification, in which—

Figure 1 is a transverse sectional view through a portion of a wheel provided with a rim embodying the features of my invention; Fig. 2 is a perspective view of the removable flange; and Fig. 3 is a perspective view of the flanged web-portion of the rim.

This invention relates to wheels that are provided with pneumatic tires or tires of thick rubber and particularly to wheels having metallic rims provided with flanges which receive a solid base portion of the tire.

The object of my invention is to provide a metallic wheel rim of the character referred to in which one flange of the rim is removable and is provided with means for preventing it from being displaced relatively to the co-operating portion of the rim, independently of the bolts which hold said flange in place.

Referring to the drawings which represent the preferred form of my invention, 1 designates the wooden felly of a wheel to which my improved metallic rim is secured by bolts 2. Said rim consists of a web portion 3 provided with a flange 4 and a co-operating removable flange 5 between which the solid base portion 6 of the tire is confined. The removable flange 5 is provided with an inwardly extending flange or lip 7 which contacts with the edge portion of the inner face of the web 3, as shown in Fig. 1, to prevent said flange from moving radially relatively to the web portion 3 and lugs 8 are formed on the inwardly projecting lip 7 to co-operate with notches 9 formed in the web 3 to prevent the flange 5 from turning relatively to the web portion. Bolts 10 extend through the removable flange and the flange 4 on the web portion and also through the base portion 6 of the tire thereby producing a sectional rim which is as solid and strong as a rim in which both flanges are formed integral with the web portion of the rim. Preferably, the base portion of the tire is provided with metal sleeves 11 through which the bolts 10 extend and these sleeves are a trifle shorter than the width of the base portion of the tire so that when the nuts on the bolts are tightened to secure the removable flange in place, portions of the base of the tire will be squeezed in between the flanges and the ends of said sleeves.

While I have herein shown the removable flange as being provided with two lugs 8 that are located diametrically opposite each other it will, of course, be understood that the number of lugs and the location of same could be varied without departing from the spirit of my invention. Furthermore, it should be understood that the lugs could be formed on the web portion 3 and the notches be formed in the inwardly projecting lip of the removable flange without departing from the spirit of my invention.

Having thus described my invention, what I claim as new and desire to secure by Letters Patent is:

A wheel comprising a felly having a flat face metal rim connected thereto, said rim being provided with an integral flange, a removable flange, a tire having a solid rectangular-shaped base portion confined between said flanges, metal sleeves extending transversely through said base portion and of less length than the width of said portion, bolts extending through said sleeves and through the flanges, and nuts on the outer ends of said bolts; substantially as described.

In testimony whereof, I hereunto affix my signature, in the presence of two witnesses, this twenty-third day of May 1906.

THOMAS FURLONG.

Witnesses:
WELLS L. CHURCH,
GEORGE BAKEWELL.